United States Patent [19]

Hlava

[11] Patent Number: 4,735,376
[45] Date of Patent: Apr. 5, 1988

[54] EASILY ASSEMBLED ANTI-REVERSE ACTUATOR

[75] Inventor: Lorens G. Hlava, Tulsa, Okla.

[73] Assignee: Brunswick Corporation, Skokie, Ill.

[21] Appl. No.: 891,533

[22] Filed: Jul. 29, 1986

[51] Int. Cl.⁴ ............................................. A01K 89/01
[52] U.S. Cl. ............................... 242/84.2 A; 188/82.3
[58] Field of Search .................. 242/84.2 R, 84.2 A, 242/84.21 A, 84.5 A, 84.51 A; 188/82.3, 82.34, 82.4

[56] References Cited

U.S. PATENT DOCUMENTS

| | | | |
|---|---|---|---|
| 4,359,197 | 11/1982 | Neufeld . | |
| 4,376,518 | 3/1983 | Gifford et al. | 242/84.5 A |
| 4,408,728 | 10/1983 | Pittman | 242/84.2 A |
| 4,463,916 | 8/1984 | Puryear | 242/84.2 A |
| 4,523,726 | 6/1985 | Swisher | 242/84.5 A |

*Primary Examiner*—Billy S. Taylor
*Attorney, Agent, or Firm*—Wood, Dalton, Phillips, Mason & Rowe

[57] ABSTRACT

Cooperating structure is provided on a deck plate and an anti-reverse actuator for assembling the actuator to a reel frame for rotation relative to the deck plate without any fasteners. In one embodiment an elongate mounting element projects rearwardly from the deck plate and has an associated keying element. The actuator has an opening to accept the body and key element with the actuator and mounting element in a first relative rotational position. With the mounting element body aligned with the opening, the actuator can be pressed forwardly until the keying element is extended entirely through the actuator opening. The actuator is then turned to a second relative rotational position which places the keying element behind a shoulder defined by the actuating element, thereby prohibiting escape of the actuator from the deck plate.

8 Claims, 2 Drawing Sheets

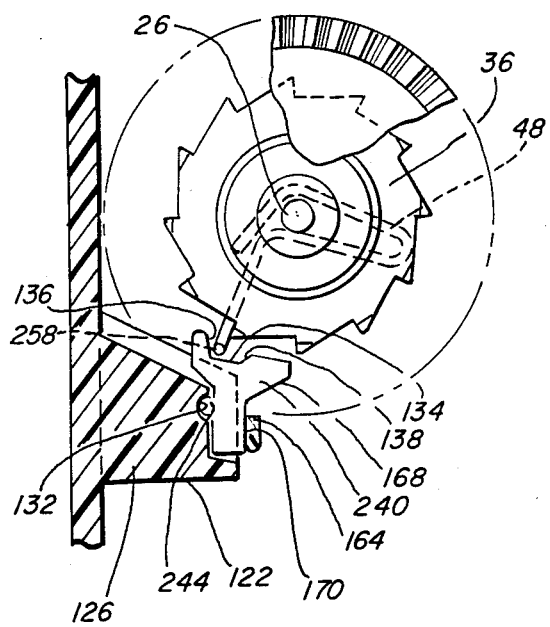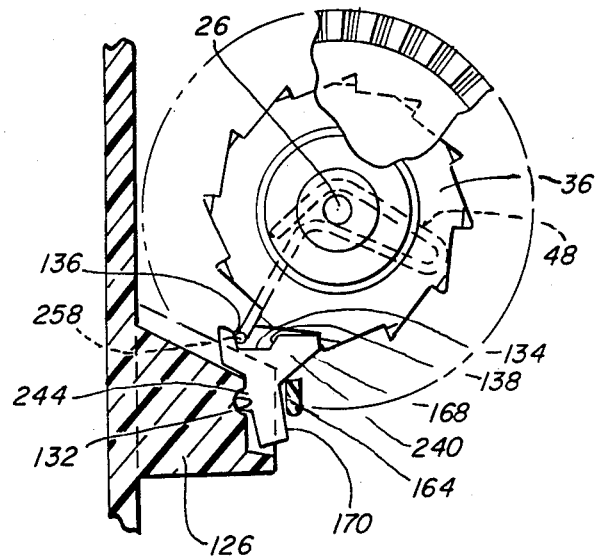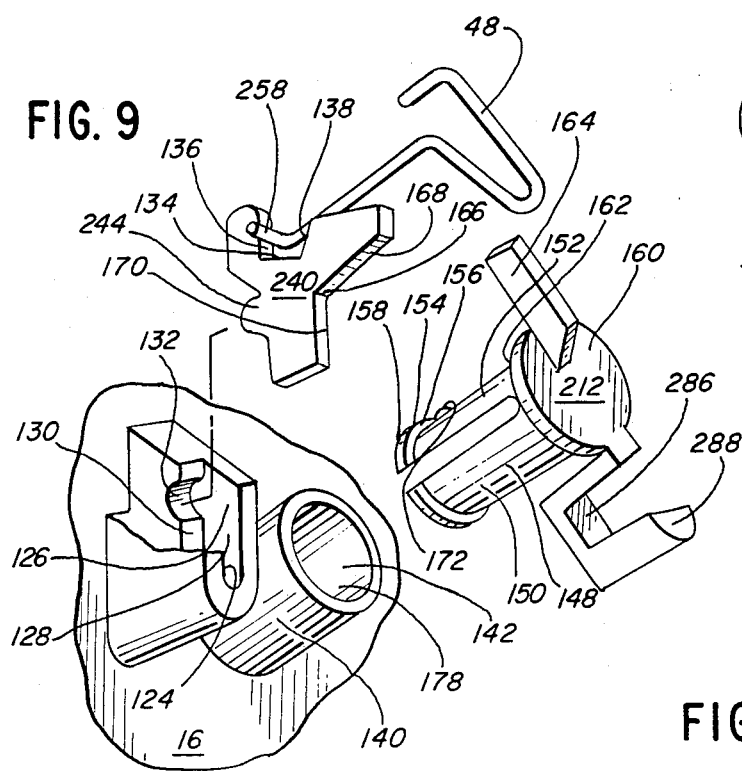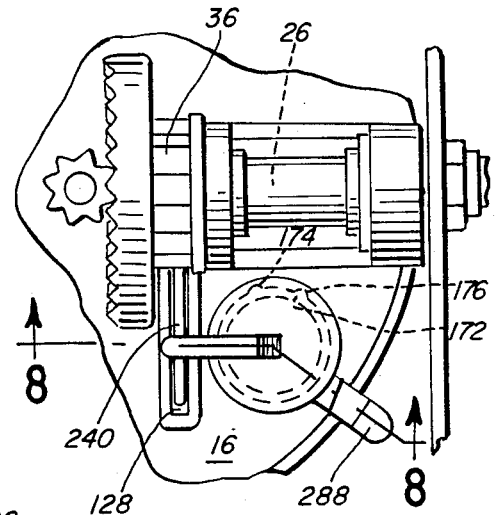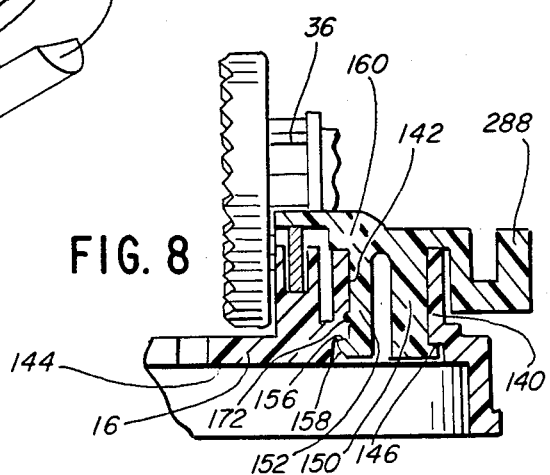

1

EASILY ASSEMBLED ANTI-REVERSE ACTUATOR

BACKGROUND OF THE INVENTION

1. Technical Field

This invention relates to fishing reels with anti-reverse mechanisms and, more particularly, to an actuator for an anti-reverse mechanism that can be readily assembled on the fishing reel.

2. Background Art

An exemplary anti-reverse mechanism for a fishing reel comprises a ratchet associated with a crank shaft through which the reel is operated. A pawl is movable between a first position, wherein the crank shaft can be freely operated in either direction, and a second position, wherein te pawl moves between teeth on the ratchet and prevents reverse rotation thereof. Movement of the pawl is imparted through an element which is frictionally attached to the crank shaft to follow movement thereof.

Typically, an actuator is provided to fix the pawl in its "off" position i.e. out of engagement with the teeth on the ratchet. The actuator exerts a force on the pawl sufficient to overcome the force exerted by the frictionally attached element on the crank shaft upon the crank shaft being reversely rotated.

In one reel construction the actuator is mounted for pivoting about an axis extending in a fore and aft direction. Typically, a deck plate within the reel housing and having a rearwardly facing flat surface serves as the support for the actuator. The actuator may be connected to the deck plate by a rivet or a bolt. This type of connection is inherently troublesome from a manufacturing standpoint. Besides having to inventory fasteners, the assembly of such an actuator involves several delicate steps, which are time consuming and thus add to the cost of manufacture.

Further, if for any reason the actuator must be removed from the reel, in the case of a rivet, the rivet has to be drilled out. This is a fairly complicated operation and the possibility of damaging the reel arises.

SUMMARY OF THE INVENTION

The present invention is specifically directed to overcoming the above enumerated problems in a novel and simple manner.

The present invention is operable generally in a reel of the type having a crank handle with an associated crank shaft, a spool, a mechanism operable through the crank handle for directing line onto the spool and an anti-reverse pawl mounted for movement between a first position wherein the pawl blocks reverse rotation of the crank shaft, and a second position wherein the crank shaft can be freely rotated in both a forward and reverse direction. The pawl is generally mounted on a deck plate within the reel housing.

According to the invention, cooperating structure is provided on the deck plate and an actuator for assembling the actuator to the reel without requiring any separate fasteners. In one embodiment an elongate mounting element projects rearwardly from the deck plate and has an associated keying element. The actuator has an opening to accept the body and keying element with the actuator and mounting element in a first relative rotational position. With the mounting element body aligned with the opening, the actuator can be pressed forwardly until the keying element is extended entirely through the actuator opening. The actuator is then turned to a second relative rotational position which places the keying element behind a shoulder defined by the actuating element, thereby prohibiting escape of the actuator from the deck plate.

With the actuator in place, an arm projects through an opening in the housing and is operable to move the actuator between "on" and "off" positions. The "on" and "off" positions are consistently realized by providing protrusions on the actuator which are selectively seated in a recess on the mounting element with the actuator in its "on" and "off" positions.

In an alternative embodiment of the invention, the actuator has an elongate body that is bifurcated to define elongate portions extending in a fore and aft direction with respect to the reel. At least one of the body portions is flexible and has an associated shoulder facing rearwardly of the actuator. The deck plate has an opening for accepting the actuator body and the opening is restricted so that passage of the actuator body through the opening requires that the flexible body portion be moved toward the other body portion to effectively reduce its diameter. Upon the actuator realizing its fully seated position, the shoulder thereon seats behind a forwardly facing shoulder on the deck plate. The actuator has a first arm that is directly engageable with the pawl and captures the pawl in operative position against the deck plate. The actuator is moved between its "on" and "off" positions upon rotation of the actuator about an axis extending lengthwise of the reel. A second arm projects through the reel housing and is used to manually control the actuator. In the second embodiment, the actuator is simply press fit into assembled relationship with the deck plate.

BRIEF DESCRIPTION OF THE DRAWINGS

FIG. 5 is a side elevation view of an alternative anti-reverse mechanism to that in FIGS. 1-4 with a modified anti-reverse actuator according to the present invention in an "off" position;

FIG. 6 is a view similar to that in FIG. 5 with the anti-reverse actuator in an "on" position;

FIG. 7 is an exploded perspective view of the anti-reverse mechanism in FIGS. 5 and 6;

FIG. 8 is a rear elevation view of the anti-reverse mechanism with the actuator in an "off" position; and FIG. 9 is a sectional view of the anti-reverse mechanism along line 9—9 of FIG. 8.

DETAILED DESCRIPTION OF THE DRAWINGS

Figure 1:
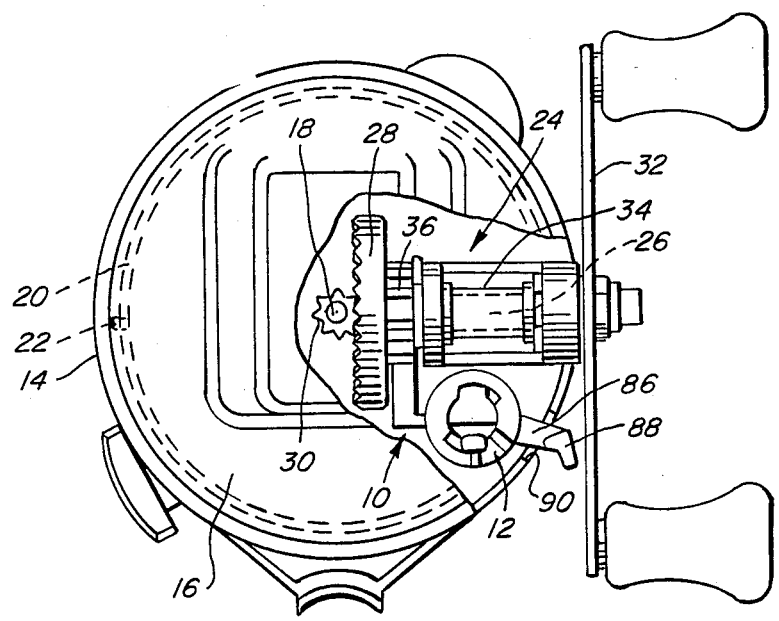
FIG. 1 is a rear elevation view of a spin cast style reel with the rear cover therefor removed and incorporating an anti-reverse mechanism and actuator according to the present invention.

In FIG. 1 the rear portion of a spin cast style fishing reel is shown having incorporated an anti-reverse mechanism shown generally at 10 with an actuator 12 therefor in accordance with the present invention. An exemplary spin cast reel suitable for incorporation of the present invention is described in detail in U.S. Pat. No. 4,376,518, to Gifford et al. Below, the basic reel operation is described to the extent necessary to understand the instant invention.

The reel has a frame comprising a housing 14 and deck plate 16 internally of the housing for mounting of the reel mechanism. A center shaft 18 extends in a fore and aft direction through the deck plate 16 and has mounted on its forward portion a spinner head assembly 20. The spinner head assembly 20 has a pick-up pin 22 which, upon rotation of the center shaft, engages and directs fishing line onto a spool (not shown).

Rotation of the center shaft is accomplished through a crank mechanism at 24. The crank mechanism 24 has a laterally directed shaft 26 extending through the reel housing. On its inside end, the crank shaft 26 has a face gear 28 in mesh with a pinion gear 30 keyed to the center shaft 18. Rotation of the crank shaft is accomplished through an operating handle 32 situated exteriorly of the housing and imparts rotation to the center shaft and associated spinner head assembly 20.

The operation of the anti-reverse mechanism at 10 will now be described with respect to FIGS. 1-4. The crank shaft 26 is journalled for rotation within a boss 34 integrally formed with the deck plate. The crank shaft 26 carries a ratchet member 36 having peripherally spaced teeth 38. The ratchet member 36 resides generally between the boss 34 and face gear 28. A movable pawl 40 has a projection 42 for situation selectively between adjacent teeth on the ratchet to arrest reverse rotation of the crank shaft with the pawl in the FIG. 3 position. The pawl has a pivot tang 44 which seats in an opening 46 in the deck plate sufficiently loosely that the pawl pivots smoothly on the tang between the FIG. 2 position, wherein the crank shaft can be reversely rotated, to the FIG. 3 position, wherein reverse rotation of the crank shaft is prohibited.

Figure 2:
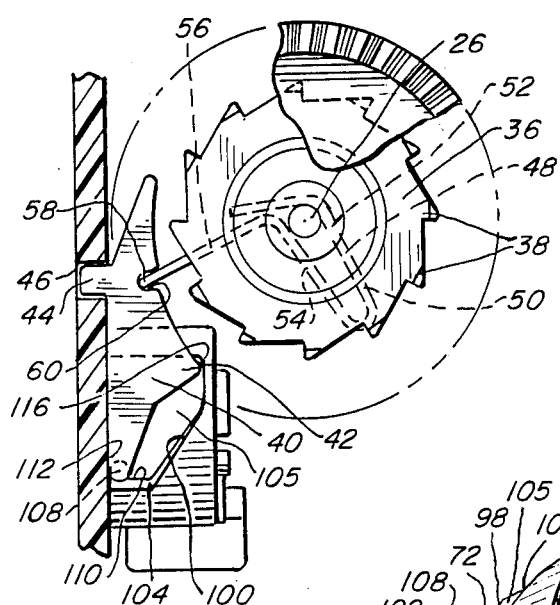
FIG. 2 is a side elevation view of the anti-reverse mechanism along line 2—2 of FIG. 1 with the anti-reverse mechanism in an "off" position.
Figure 3:
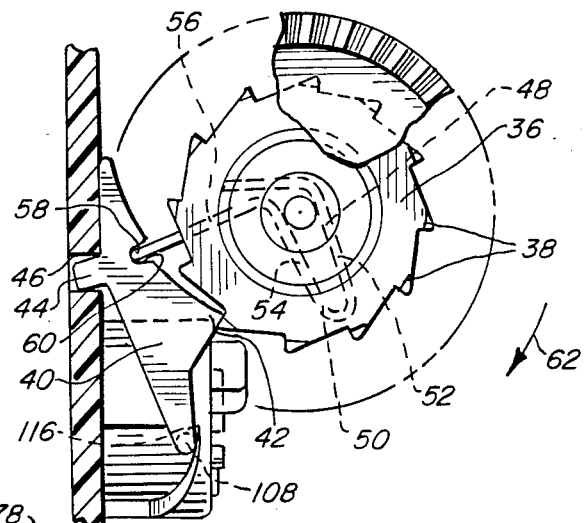
FIG. 3 is a view similar to that in FIG. 2 with the anti-reverse mechanism in an "on" position.

The pawl 40 moves between the FIG. 2 and FIG. 3 positions in response to movement of the crank shaft 26. Rotation of the crank shaft 26 effects rocking of the pawl on the tang through a wire spring element 48 which frictionally grasps the crank shaft. The spring element 48 has a main, U-shaped portion 50 with an opening between legs 52, 54 that is slightly less than the diameter of the crank shaft 26. To assemble the spring 48, the legs 52, 54 are biased away from each other and the crank shaft is introduced into the opening between legs 52, 54, with the spring situated in captive relationship laterally between the boss 34 and ratchet member 36. The leg 52 of the U-shaped portion 50 has an offset 56 in the plane of the center line of the U and at its free end a turned portion 58 extending laterally of the reel. The turned portion 58 seats in a notch 60 on the pawl 40.

The spring 48 frictionally grasps the crank shaft to follow rotation thereof. With reference to FIG. 3, it can be seen that rotation of the crank shaft clockwise, in the direction of arrow 62 in FIG. 3, urges the pawl 40 in a counterclockwise direction about the tang 44, thus bringing the projection 42 inbetween adjacent teeth and thereby arresting reverse rotation of the crank shaft.

The present invention is concerned principally with the actuator for manually overriding the anti-reverse mechanism at 10. The actuator 12 is operable to maintain the pawl in the FIG. 2 position i.e. in its "off" position, so that reverse rotation of the crank shaft can occur. In the "on" position for the actuator, the pawl is free to follow rotation of the crank shaft as imparted through the spring 48.

According to the invention, a mounting element 64 is formed integrally with the deck plate 16 and has an elongate body 66 projecting rearwardly of the deck plate. The body 66 is substantially cylindrical in configuration and has at its free end radially oppositely projecting keying elements 68, 70.

The actuator 12 has a cylindrical body 72 with a rearwardly facing annular shoulder 74 and a bore 76, or opening, extending axially thereof of substantially equal diameter to the body 66 of the mounting element 64. The body 72 has diametrically opposite keyways 78, 80 extending axially the length of the cylindrical body 72 for accepting the keying elements 68, 70 with the mounting element 64 and actuator in a first relative rotational position.

To assemble the actuator, the actuator 12 and mounting element 64 are aligned as in FIG. 2 and the actuator 12 is directed forwardly towards the deck plate sufficiently that they keying elements 68, 70 project beyond the annular shoulder 74 at the rear of the actuator 12. By misaligning the keying elements 68, 70 and keyways 78, 80, shoulders 82, 84 on the keying elements 68, 70 respectively face the annular shoulder and interference is thereby established which prohibits removal of the actuator from the mounting element 64.

Figure 4:
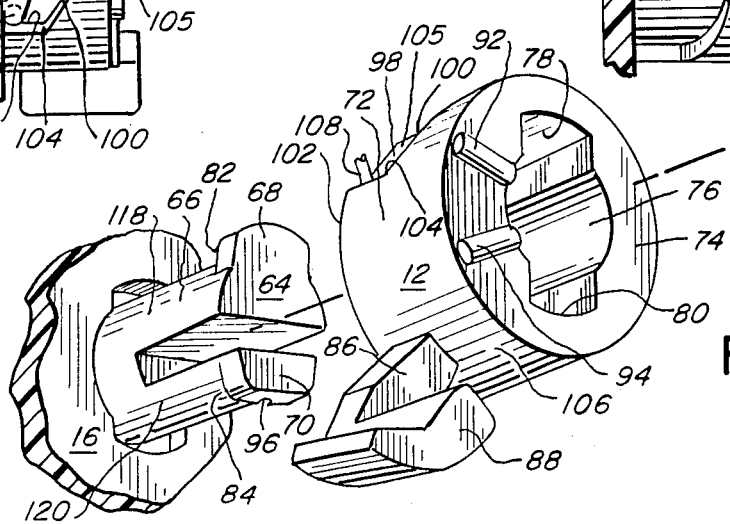
FIG. 4 is an exploded perspective view of the anti-reverse actuator according to the present invention.

The "off" position of the anti-reverse actuator is realized upon rotation of the actuator approximately 80° in a counterclockwise direction from the FIG. 4 position. Rotation of the actuator is facilitated through an L-shaped arm 86 having a portion 88 projecting through an opening 90 in the reel housing 14. Upon rotation of the actuator approximately 20° from the "off" position in a counterclockwise direction, the "on" position for the actuator is realized.

To positively and consistently locate the actuator in each of the "on" and "off" positions, rearward projections 92, 94 are integrally formed on the annular shoulder 74. The projections 92, 94 seat alternatively in a forwardly opening recess 96 in the shoulder 84 on the keying element 70. A user can sense the engagement between the projection and recesses in both the "on" and "off" positions as the projections snap into place.

To control the pawl, the cylindrical body 72 has a radial undercut 98 extending through approximately 90° around the body. The undercut 98 defines a forwardly facing cam surface 100 which progressively rises from the forward wall 102 of the actuator from its low point 104 shown in FIG. 2.

The undercut 98 defines a space 105 inwardly from the peripheral surface 106 of the body 72 within which a post 108, projecting laterally on the pawl, is confined throughout the operation ranges for both the pawl and the actuator. Upon the actuator being situated over the mounting element 64 and the actuator being turned to the "off" position shown in FIG. 2, the post 108 finds its way into the space 105 at the lowest point 104 of the cam surface 100. Rotation of the actuator in a clockwise direction in FIG. 4 is arrested by an edge 110 bounding the space 105, which edge 110 resides in the path of the post 108.

With the actuator in the "off" position in FIG. 2, the post is confined between the rearwardly facing surface 112 and the low point 104 of the cam surface. The post 108 abuts the cam surface before the projection 42 can pivot between the teeth 38 on the ratchet member.

Upon rotation of the actuator counterclockwise to the "on" position, the post 108 aligns longitudinally adjacent the high point 116 of the cam surface. The allowed range of pivoting of the pawl between the deck plate and high point 116 is sufficient to allow the projection 42 to move between adjacent teeth 38 on the ratchet member 36. In the "off" position of the actuator in FIG. 3, the pawl will follow movement of the spring 48 back and forth between the FIG. 2 and FIG. 3 positions.

In FIG. 4, the mounting element 64 is bifurcated to define first and second mounting element portions 118, 120 respectively. The mounting element portion 120 is readily flexible towards and away from the portion 118 to effectively reduce the diameter of the elongate body 66. This feature is desirable in that it facilitates placement of the mounting element into the actuator. Further, the flexibility is desirable in seating the projections 92 and 94 in the recess 96. As the projections ride in and out of the recess, a slight flexing of the mounting element portion 120 occurs to facilitate the same.

An alternative embodiment of the invention is depicted in FIGS. 5-9. The basic anti-reverse mechanism comprising the crank shaft 26, ratchet member 36 and wire spring 48 is identical to that in the embodiment in FIGS. 1-4. The difference in the alternative embodiment resides in the actuator 212 and pawl 240 with which the actuator cooperates.

Briefly, the deck plate 16 has an integral boss 122 with spaced walls 124, 126 bounding a vertically extending slot 128 that is slightly greater in width than the thickness of the pawl 240. The bottom wall 130 of the slot 128 has a curved seat 132 for pivotally accepting the tang 244 on the pawl 240. With the tang 244 positioned in the seat 132, the pawl is free to pivot about the tang 244 between its position in FIG. 5, wherein the crank shaft is free to rotate in a reverse direction, and its position in FIG. 6, wherein reverse rotation of the crank shaft is arrested. The movement of pawl 240 between the FIG. 5 and FIG. 6 positions is controlled by the spring 48, which frictionally grasps the crank shaft as in the prior embodiment. The turned portion 258 of the spring is positioned in a substantially U-shaped notch 134 in the pawl and bears selectively against edges 136, 138 bounding the notch, depending upon the direction of rotation of the crank shaft.

The actuator 212 according to the present invention serves a dual purpose. First, the actuator 212 maintains the pawl 240 captively within the slot 128. Second, with the actuator 212 in its "off" position, the pawl is confined by the actuator to the FIG. 5 position. In the "on" position of the actuator 212, the pawl is free to pivot between the FIG. 5 and FIG. 6 positions.

According to the invention, the deck plate 16 has an integrally formed boss 140 with a substantially cylindrical bore 142 or opening therein extending lengthwise of the reel. The forwardly facing wall 144 of the deck plate has an annular undercut 146 in coaxial alignment with the bore 142.

The actuator 212 comprises an elongate body 148 that is bifurcated to define first and second elongate body portions 150, 152 respectively. The second body portion 152 is flexible towards the first body portion to effectively reduce the diameter of the body 148. The second body portion has at its free end a radially projecting lip 154 with a rearwardly facing shoulder 156. The lip has a ramp surface 158 increasing in diameter from the free end of the body 148 towards an enlarged head 160 on the body 148. The enlarged head defines a forwardly facing, annular shoulder 162.

To assemble the actuator 212, the first and second body portions 150, 152 are introduced to the bore 142 in the boss 140. The ramp surface 158 progressively deflects the second body portion 152 towards the first body portion 150 sufficiently that the body 148 can be extended through the bore 142. In a fully seated position, the lip 154 clears the undercut 146 and springs back to its undeformed state. The boss is thereby retained captively between the shoulder 156 on the lip 154 and the shoulder 162 on the head 160. The actuator is thereby free to rotate within the bore 142 but cannot escape from the deck plate without manually depressing the second body portion 152 towards the first body portion 150.

With the actuator 212 in place, a first arm 164 projecting radially from the head 160 overlies the pawl 240 as shown in FIG. 5. This represents the "off" position and in this position the actuator will maintain the pawl in the FIG. 5 position in spite of a force being applied through the spring 48 upon reverse rotation of the crank shaft.

Rotation of the actuator 212 in a clockwise direction in FIG. 7 brings the arm 164 in the vicinity of the juncture 166 of two transverse edges 168, 170 adjacent the rear of the pawl. With the arm 164 so positioned, the tang 244 is maintained in the seat 132, yet the pawl is free to pivot to the FIG. 6 position. Counterclockwise pivoting of the pawl is confined by the first arm 164, which encounters the edge 170 of the pawl.

The pawl is manipulated through an associated L-shaped second arm 286 corresponding to the arm 86 in FIG. 2. A portion 288 of arm 286 projects through an opening in the housing and is readily operable by a user.

To positively and consistently locate the actuator in the "on" and "off" positions, a dimple 172 is provided on the second body portion 152 and seats alternatively in recesses 174, 176 in the surface 178 bounding the bore 142 depending upon whether the actuator is in its "on" or "off" position.

It should be understood that the foregoing detailed description was made for purposes of demonstrating the inventive structure and the operation thereof, with no unnecessary limitations to be understood therefrom.

I claim:

1. In a fishing reel of the type having a frame comprising a housing and a deck plate, a crank handle that is rotatable selectively in forward and reverse directions, a ratchet member rotatable with the crank handle, a spool, a mechanism operable through said crank handle for directing line onto the spool and an anti-reverse pawl mounted for movement between a first position wherein the pawl acts against the ratchet member to block rotation of the crank handle in said reverse direction and a second position wherein the crank handle can be rotated in said reverse direction without interference between the pawl and ratchet member, the improvement comprising:

an anti-reverse actuator for selectively maintaining the pawl in the second pawl position;
a mounting element on the reel frame;
cooperating means on the mounting element and anti-reverse actuator for maintaining the anti-reverse actuator on the reel,
said cooperating means comprising an elongate body projecting away from a flat wall and having a substantially cylindrical outer surface on one of the actuator and mounting element and an opening in the other of the actuator and mounting element for accepting the elongate body and bounded by a generally cylindrical surface which, with the elongate body in the opening, cooperates with the outer surface of the elongate body to guide relative rotational movement between the actuator and mounting element about a first axis;

said elongate body having a key element projecting radially beyond the outer surface of the elongate body and defining a shoulder facing along said first axis in a first direction towards said flat wall, said other of the actuator and mounting element having a wall facing in a direction opposite to said first direction and defining a keyway for accepting the key element, said keyway being contiguous with said opening and extending radially outwardly of the cylindrical surface bounding the opening, said keyway being radially alignable with the key element in a first relative rotational position of the anti-reverse actuator and mounting element with the elongate body and opening in axial alignment so that the anti-reverse element and mounting element can be moved relative to each other axially of said elongate body into overlapping relationship, said other of the actuator and mounting element having an axial extent less than the spacing between said key element shoulder and flat wall to thereby permit said shoulder on the key element to be passed entirely through the opening on the other of the mounting element and anti-reverse actuator, whereby said anti-reverse actuator can be assembled to and separated from the mounting element with the anti-reverse actuator and mounting element in said first relative rotational position by relatively moving the mounting element and anti-reverse actuator axially of said elongate body, said anti-reverse actuator being inseparable from the mounting element with the anti-reverse actuator and mounting element in a second relative rotational position wherein the key element is passed entirely through the opening in the other of the mounting element and anti-reverse actuator and the anti-reverse actuator and mounting element are rotated relative to each other from said first relative rotational position so that the shoulder on the key element faces the flat wall on the other of the anti-reverse actuator and mounting element, whereby said anti-reverse actuator can be assembled on the fishing reel without requiring the use of separate fasteners.

2. The improved fishing reel according to claim 1 wherein said anti-reverse actuator blocks the pawl in the second pawl position with the anti-reverse actuator in an "off" position and cooperating means are provided on the anti-reverse actuator and mounting element to consistently locate the anti-reverse actuator in its "off" position.

3. The improved fishing reel according to claim 1 wherein means mount said pawl for pivoting movement between said first and second pawl positions about a second axis transverse to said first axis and said pawl has a post extending transversely to said first axis, said anti-reverse actuator is rotatable about said first axis between an "on" position and an "off" position, said anti-reverse actuator has a cam surface and with the anti-reverse actuator in the "off" position the pawl post is blocked with the pawl in the second pawl position by said cam surface and with the anti-reverse actuator in the "on" position the pawl can move between the first and second pawl positions without interference between the pawl and cam surface.

4. The improved fishing reel according to claim 2 wherein the cooperating means to locate the anti-reverse actuator in its "off" position comprises a protrusion on one of the mounting element and anti-reverse actuator and a recess for accepting the protrusion on the other of the mounting element and anti-reverse actuator.

5. The improved fishing reel according to claim 3 wherein said anti-reverse actuator has a cylindrical body coaxially aligned with the first axis and said body is radially undercut to define said cam surface, said cam surface facing in said first direction with the anti-reverse actuator assembled.

6. The improved fishing reel according to claim 4 wherein said mounting element has a body that is elongate in said first direction and said body is bifurcated to define first and second mounting element body portions extending in said first direction whereby at least one of the first and second mounting element body portions is flexible to facilitate engagement between the protrusion and recess.

7. In a fishing reel of the type having a frame comprising a housing and a deck plate with a flat rearwardly facing surface, a crank handle that is rotatable selectively in forward and reverse directions, a ratchet member rotatable with the crank handle, a spool, a mechanism operable through said crank handle for directing line onto the spool, an anti-reverse pawl mounted for pivoting movement generally about an axis extending laterally of the reel between a first position wherein the pawl acts against the ratchet member to block rotation of the crank handle in said reverse direction and a second position wherein the crank handle can be rotated in said reverse direction, the improvement comprising:

an anti-reverse actuator having a first arm;

one of said anti-reverse actuator and deck plate having an elongate substantially cylindrical body with a first axis extending in a fore and aft direction with respect to the deck plate, said first actuator arm extending radially beyond the elongate body;

the other of said anti-reverse actuator and deck plate having a substantially cylindrical opening for accepting the elongate body upon the anti-reverse actuator being aligned with the deck plate with the elongate body and opening coaxial and moved relative to the deck plate in a first direction substantially perpendicular to the flat deck plate surface into operative position; and means for press-fitting and maintaining the anti-reverse actuator in operative position on the deck plate for movement about the first axis of the elongate body and opening between an "on" position wherein the pawl can move between the first and second pawl positions without interference between the pawl and first arm and an "off" position wherein the first arm on the anti-reverse actuator directly engages and blocks the pawl in its second position upon the anti-reverse actuator being moved in the first direction relative to the deck plate into said operative position.

8. The improved fishing reel according to claim 7 wherein the elongate body is on the anti-reverse actuator and there is a second arm extending from the actuator body transversely to the axis of rotation of the actuator and having a portion projecting through the reel housing, said projecting arm portion usable to move the anti-reverse actuator between said "on" and "off" positions.

* * * * *